(12) United States Patent
Murofushi et al.

(10) Patent No.: US 8,000,375 B2
(45) Date of Patent: Aug. 16, 2011

(54) INTERROGATOR

(75) Inventors: Nobuo Murofushi, Susono (JP);
Masakazu Kato, Numazu (JP)

(73) Assignee: Toshiba Tec Kabushiki Kaisha (JP)

( * ) Notice: Subject to any disclaimer, the term of this patent is extended or adjusted under 35 U.S.C. 154(b) by 832 days.

(21) Appl. No.: 12/002,487

(22) Filed: Dec. 17, 2007

(65) Prior Publication Data

US 2008/0175305 A1 Jul. 24, 2008

(30) Foreign Application Priority Data

Dec. 21, 2006 (JP) ................................. 2006-344856

(51) Int. Cl.
*H04B 1/713* (2006.01)

(52) U.S. Cl. ........ 375/133; 375/130; 375/132; 375/134; 375/135; 375/136

(58) Field of Classification Search ................. 375/132, 375/133, 135, 136, 130, 134
See application file for complete search history.

(56) References Cited

U.S. PATENT DOCUMENTS

| | | | | |
|---|---|---|---|---|
| 5,946,624 A | * | 8/1999 | Petranovich et al. | 455/447 |
| 6,061,389 A | * | 5/2000 | Ishifuji et al. | 375/133 |
| 2008/0079542 A1 | * | 4/2008 | Rofougaran | 340/10.1 |

FOREIGN PATENT DOCUMENTS

JP 9-102980 4/1997

* cited by examiner

*Primary Examiner* — Leon Flores
(74) *Attorney, Agent, or Firm* — Harness, Dickey & Pierce, P.L.C.

(57) ABSTRACT

A hopping pattern setting section sets, as a frequency hopping pattern code, elements of a matrix in which all integers of "1" to "the number of frequencies to be used" appear only once and which is obtained by adding, as an offset, any one of integers of "0" to "(the number of frequencies to be used)-1" to each of elements of a matrix obtained by excluding integers larger than the number of frequencies to be used from a matrix in which all integers of "1" to "(prime number larger than the number of frequencies to be used)-1" appear only once. A frequency oscillation section converts the frequency hopping pattern code into the frequencies to be used to output unmodulated signals of the frequencies to a transmission section and a reception section.

38 Claims, 11 Drawing Sheets

| 21 — | Production number | ZZZZZZ | | | | | | | |
|---|---|---|---|---|---|---|---|---|---|
| 22 — | Pattern code | $X_{0k}$ | $X_{1k}$ | $X_{2k}$ | $X_{3k}$ | $X_{4k}$ | $X_{5k}$ | $X_{6k}$ | $X_{7k}$ | $X_{8k}$ |
| 23 — | Cyclic counter | n | | | | | | | |

| 31 | Identification number | 1 | 2 | 3 | 4 | 5 | 6 | 7 | 8 | 9 |
|---|---|---|---|---|---|---|---|---|---|---|
| | Frequency | F1 | F2 | F3 | F4 | F5 | F6 | F7 | F8 | F9 |

| Pattern 0 | X00 | X10 | X20 | X30 | X40 | X50 | X60 | X70 | X80 |
|---|---|---|---|---|---|---|---|---|---|
| Pattern 1 | X01 | X11 | X21 | X31 | X41 | X51 | X61 | X71 | X81 |
| Pattern 2 | X02 | X12 | X22 | X32 | X42 | X52 | X62 | X72 | X82 |
| Pattern 3 | X03 | X13 | X23 | X33 | X43 | X53 | X63 | X73 | X83 |
| Pattern 4 | X04 | X14 | X24 | X34 | X44 | X54 | X64 | X74 | X84 |
| Pattern 5 | X05 | X15 | X25 | X35 | X45 | X55 | X65 | X75 | X85 |
| Pattern 6 | X06 | X16 | X26 | X36 | X46 | X56 | X66 | X76 | X86 |
| Pattern 7 | X07 | X17 | X27 | X37 | X47 | X57 | X67 | X77 | X87 |
| Pattern 8 | X08 | X18 | X28 | X38 | X48 | X58 | X68 | X78 | X88 |

22

F I G. 1 1

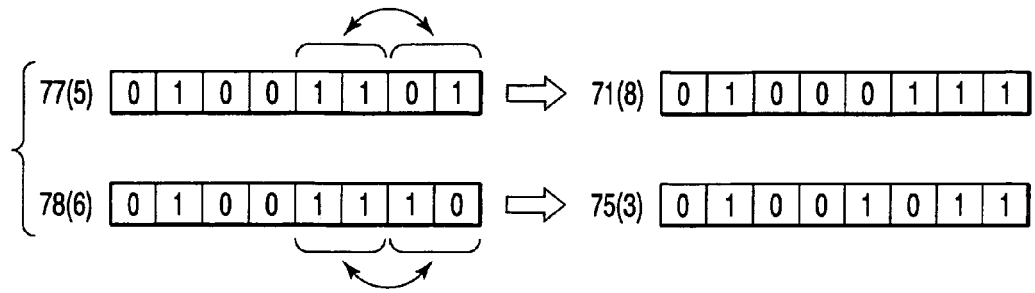
FIG. 14
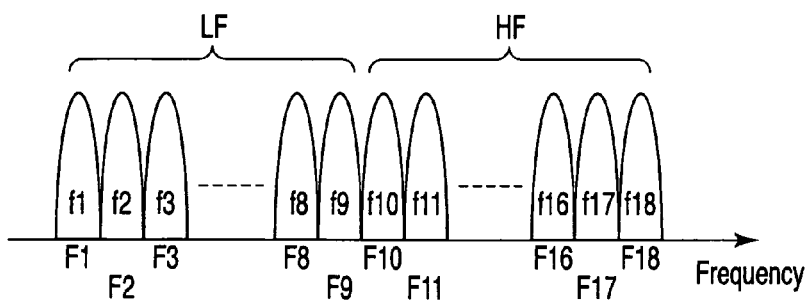
FIG. 15
| | Identification number | 1 | 2 | 3 | 4 | 5 | 6 | 7 | 8 | 9 |
|---|---|---|---|---|---|---|---|---|---|---|
| 24 — | Frequency L | F1 | F2 | F3 | F4 | F5 | F6 | F7 | F8 | F9 |
| | Frequency H | F10 | F11 | F12 | F13 | F14 | F15 | F16 | F17 | F18 |
| 25 — | Frequency level information | | | | L / H | | | | | |
FIG. 16

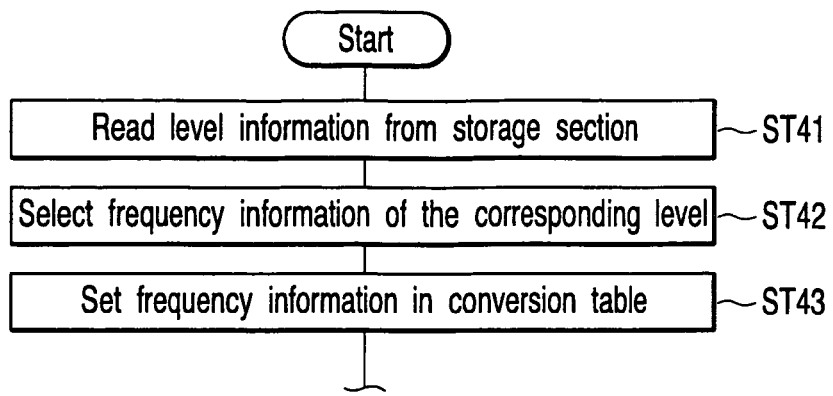
FIG. 17
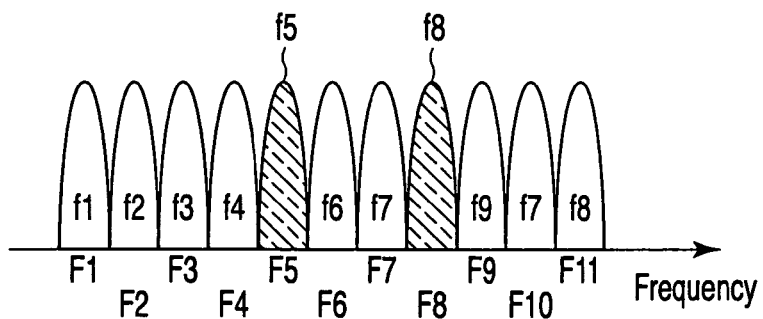
FIG. 18
| 31 | Identification number | 1 | 2 | 3 | 4 | 5 | 6 | 7 | 8 | 9 |
|---|---|---|---|---|---|---|---|---|---|---|
| | Frequency | F1 | F2 | F3 | F4 | F10 | F6 | F7 | F11 | F9 |
FIG. 19

INTERROGATOR

CROSS-REFERENCE TO RELATED APPLICATIONS

This application is based upon and claims the benefit of priority from prior Japanese Patent Application No. 2006-344856, filed Dec. 21, 2006, the entire contents of which are incorporated herein by reference.

BACKGROUND OF THE INVENTION

1. Field of the Invention

The present invention relates to an interrogator which employs a scheme which perform radio communication with a responder such as a Radio Frequency Identification (RFID) tag while changing communication frequencies with time, i.e., a so-called frequency hopping scheme.

2. Description of the Related Art

In recent years, a radio communication system called a RFID system attracts attention. This system is constituted by an interrogator and a compact responder. The responder includes an IC chip and an antenna, and is generally called a RFID tag, a radio tag, an electronic tag, or the like. The interrogator performs radio communication with the responder by using an electric wave or an electromagnetic wave to write and read data in a non-contact manner. The interrogator is generally called a reader/writer, or the like.

Some interrogators employ a frequency hopping scheme, which is a kind of spread spectrum scheme. The interrogator of this type changes frequencies at which communication is performed with time according to a preset frequency hopping pattern. This operation is called a frequency hopping operation.

In general, when a plurality of interrogators are arranged in a limited region, adjacent interrogators interfere with each other when the interrogators use the same frequency. However, when the frequency hopping scheme is employed, interference between the interrogators can be reduced. However, when the interrogators use the same frequency hopping pattern while shifting phases, adjacent interrogators may perform hopping operations at the same frequency at the same time. In this case, the two adjacent interrogators may continuously use the same frequency for a long period of time.

Japanese Patent No. 2984588 proposes a procedure for forming a frequency hopping pattern in which, even though adjacent interrogators use the same frequency at a certain period of time, frequencies used in the interrogators can be made different from each other by a hopping operation.

However, a frequency hopping pattern formed by a conventional forming procedure is a pattern using "(prime number)-1" frequencies. When the number of frequencies to be used is limited to "(prime number)-1", all allocated frequencies may not be able to be used.

For example, in International Organization for Standardization (ISO)/International Electrotechnical Commission (IEC) 18000-6, an international standard using a frequency band of 860 to 960 MHz in an RFID system is created. However, frequencies to be used change depending on nations or regions. In Japan, a UHF band of 952 to 954 MHz (1 to 9 channels) or 952 to 955 MHz (1 to 14 channels) is allocated.

Therefore, it is desired that, even though a frequency hopping pattern in which the number of frequencies to be used is not "(prime number)-1" is used, two adjacent interrogators are prevented from continuously using the same frequency for a long period of time.

BRIEF SUMMARY OF THE INVENTION

The present invention has as its object to provide a interrogator which can reduce interference with another adjacent interrogator as much as possible even though a frequency hopping pattern in which the number of frequencies to be used is not "(prime number)-1" is used.

According to one aspect of the present invention, a interrogator which performs radio communication with a responder by a frequency hopping scheme comprises: hopping pattern setting means for setting, as a frequency hopping pattern code, elements of a matrix in which all integers of "1" to "the number of frequencies to be used" appear only once and for obtaining by adding, as an offset, any one of integers of "0" to "(the number of frequencies to be used)-1" to each of elements of a matrix obtained by excluding integers larger than the number of frequencies to be used from a matrix in which all integers of "1" to "(prime number larger than the number of frequencies to be used)-1" or "1" to "(positive integer power of a prime number larger than the number of frequencies to be used)-1" appear only once; frequency oscillation means for converting the frequency hopping pattern code set by the hopping pattern setting means into the frequencies to be used to output unmodulated signals of the frequencies; transmission means for modulating the unmodulated signal output by the frequency oscillation means by transmission data to output a modulated signal to an antenna; and reception means for demodulating the modulated signal received by the antenna by the unmodulated signal output by the frequency oscillation means.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a pattern diagram showing a data structure stored in a hopping pattern memory in a second embodiment;

FIG. 14 is a pattern diagram showing an example of a bit replacing method in the third embodiment;

FIG. 15 is a pattern diagram showing relationships between available frequencies f1 to f18 in a fourth embodiment;

FIG. 16 is a pattern diagram showing a main memory area formed in a storage section in the fourth embodiment;

FIG. 17 is a flow chart showing a main part of a main control procedure executed by a control section in the fourth embodiment;

FIG. 18 is a pattern diagram showing a state in which two frequencies f5 and f8 of the available frequencies f1 to f11 are used in another radio 15, transceiver in the fourth embodiment; and FIG. 19 is a pattern diagram showing an example of data set in a frequency conversion table in the state in FIG. 18.

DETAILED DESCRIPTION OF THE INVENTION

A best mode for carrying out the present invention will be described below with reference to the accompanying drawings.

First Embodiment

In the embodiment, the present invention is applied to an interrogator used in an RFID system using 952 to 954 MHz (1 to 9 channels) in a UHF band. More specifically, in the embodiment, frequencies to be used are 9 frequencies of 1 to 9 channels.

Figure 1:
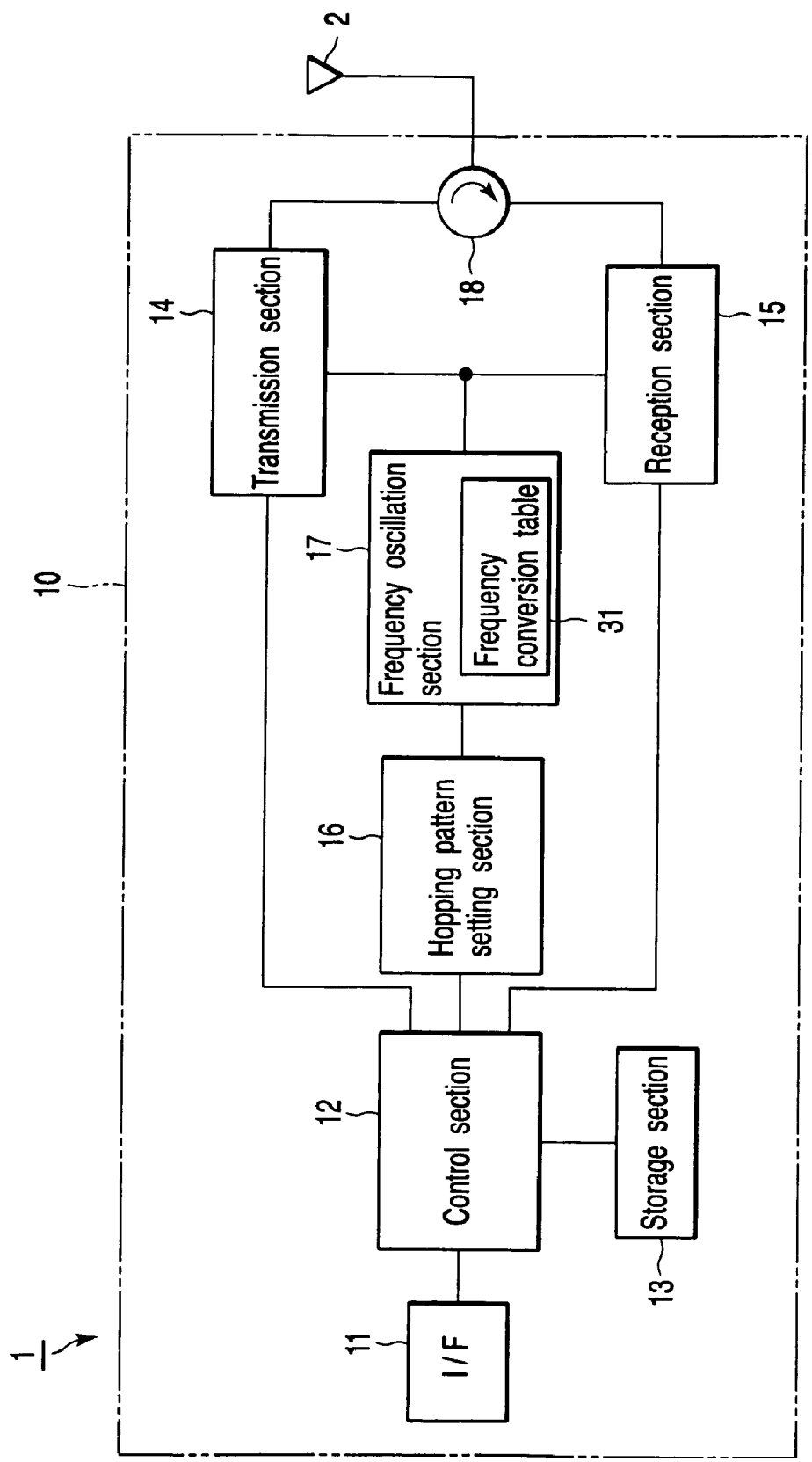
FIG. 1 is a block diagram showing a main configuration of an interrogator according to an embodiment of the present invention.

FIG. 1 is a block diagram showing a main configuration of an interrogator 1. The interrogator 1 is constituted by a main body 10 and an antenna 2. The interrogator 1 uses the antenna 2 to perform radio transmission and reception from/to an RFID tag (not shown) serving as a responder.

The main body 10 is constituted by an interface section 11, a control section 12, a storage section 13, a transmission section 14, a reception section 15, a hopping pattern setting section 16, a frequency oscillation section 17, a circulator 18, and the like.

The interface section 11 is connected to a host device (not shown) such as a computer or various controllers through a communication circuit, and controls data transmission/reception between the host device and the control section 12. The control section 12 generates transmission data on the basis of a command or the like given by the host device through the interface section 11 and outputs the transmission data to the transmission section 14. The transmission section 14 modulates an unmodulated wave oscillated and output from the frequency oscillation section 17 by the transmission data output from the control section 12 and outputs the modulated signal to the circulator 18. The circulator 18 transmits the modulated signal from the transmission section 14 to the antenna 2. In this manner, the modulated signal is radiated from the antenna 2 as a radio wave.

When the radiated radio wave reaches the RFID tag, the RFID tag is activated. The activated RFID tag performs a receiving operation which returns a response radio wave, for example. When the response radio wave radiated from the RFID tag is received by the antenna 2, the radio wave is output to the circulator 18 as a reception signal. The circulator 18 transmits the reception signal from the antenna 2 to the reception section 15. The reception section 15 multiplies the reception signal by the unmodulated wave oscillated and output from the frequency oscillation section 17 to convert the reception signal into a baseband signal, and demodulates the baseband signal. The reception section 15 outputs the demodulated receiving data to the control section 12. The control section 12 analyzes the receiving data input from the reception section 15 and transmits the analyzed data to the upper device through the interface section 11 as needed.

In the storage section 13, a program to determine an operation of the control section 12, a set value of transmission power control, a threshold value of carrier sense level, and the like are stored. A product number memory 21, a hopping pattern memory 22, and a cyclic counter memory 23 are formed on the storage section 13.

In the product number memory 21, a unique product number is stored. The product number is set for every interrogator when each interrogator is manufactured. In the hopping pattern memory 22, frequency hopping pattern codes $x_{0k}$ to $x_{8k}$ are stored. A procedure of forming the frequency hopping pattern code will be described later. In the cyclic counter memory 23, an integer n from an initial value "1" to the number of elements of the frequency hopping pattern codes $x_{0k}$ to $x_{8k}$ are counted. When the cyclic counter memory 23 counts to an integer N, the value of the counter returns to the initial value "1".

The control section 12, at the start-up time, reads the frequency hopping pattern codes $x_{0k}$ to $x_{8k}$ in the hopping pattern memory 22 and sets the frequency hopping pattern codes $x_{0k}$ to $x_{8k}$ in the hopping pattern setting section 16. The hopping pattern setting section 16 outputs the set frequency hopping pattern codes $x_{0k}$ to $x_{8k}$ to the frequency oscillation section 17 depending on a switch command from the control section 12.

In the frequency oscillation section 17, a frequency conversion table 31 is arranged. In the frequency conversion table 31, as shown in FIG. 3, serial numbers from the integer "1" to the number of frequencies "9" to be used are set as frequency identification numbers, and frequency data F1 to F9 used as the frequency identification numbers in one-to-one correspondence are used.

Figures 2, 3, 4:
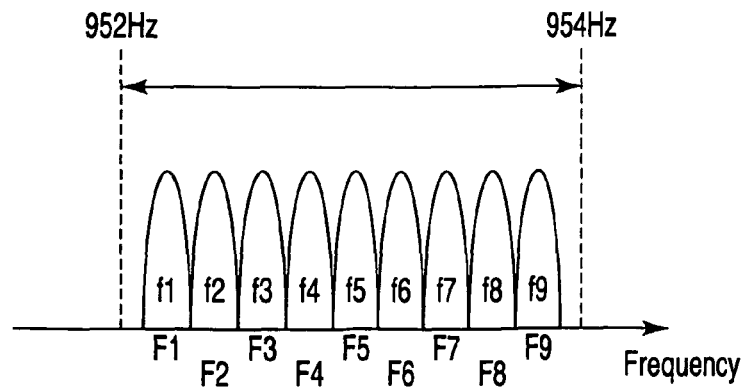
FIG. 2 is a pattern diagram showing a main memory area formed in a storage section of the interrogator.
FIG. 3 is a pattern diagram showing an example of data set in a frequency conversion table of the interrogator.
FIG. 4 is a pattern diagram used to explain frequencies used in a first embodiment.

In the embodiment as shown in FIG. 4, the frequency data F1 to F9 corresponding to 9 different frequencies f1 to f9 in an UHF bandwidth of 952 to 954 MHz in the UHF band are set in the frequency conversion table 31.

The frequency oscillation section 17 searches the frequency conversion table 31 by using a code input from the hopping pattern setting section 16 to acquire corresponding frequency data, and oscillates and outputs an unmodulated signal of a frequency corresponding to the frequency data to the transmission section 14 and the reception section 15.

In this case, a procedure of forming frequency hopping pattern codes $x_{0k}$ to $x_{8k}$ in the embodiment will be described below.

First, in the RFID system, the number of frequencies to be used is represented by i, a prime number larger than the number i of frequencies to be used is represented by q, a primitive element is represented by α, and the integer n is set to "0" to "q−2". In this case, a circulant matrix Z can be expressed by equation (1) and equation (2). In the matrix Z, all numbers from the integer "1" to an integer "q−1" appear only once at pseudo random. When the prime number q is given by "$q^m$", which is the power of a prime number where an exponent m is given by an integer, the circulant matrix Z can be expressed by equation (1) and equation (2) when the integer n is set to "0" to the positive integer power of prime number $q^m$. In the matrix Z, all numbers of the integer "1" to an integer "$q^m-1$" appear only once at pseudo random.

$$z_n = \alpha^n \bmod q \quad (1)$$

$$Z = \{z_0, z_1, z_2, \ldots, z_{q-2}\} \quad (2)$$

The right-hand side [$\alpha^n$ mod. q] of equation (1) expresses a remainder obtained by dividing "$\alpha^n$" by "q". Note that "$z_{q-1}$" is "$z_0$", and "$z_q$" is "$z_1$".

Since the number i of frequencies to be used is smaller than the prime number q, numbers larger than the number i of frequencies to be used are deleted from the matrix Z of numbers. A matrix Y obtained by deleting the numbers larger than the number i of frequencies to be used from the matrix Z is given by equation (3).

$$Y = \{y_0, y_1, y_2, \ldots, y_{i-1}\} \quad (3)$$

The integer "0" to the integer "i−1" are added to elements $\{y_0, y_1, y_2, \ldots, y_{i-1}\}$ of the matrix Y as offsets, respectively. More specifically, a variable j is given by the integer "0" to the integer "i−1", an offset k is given by the integer "0" to the integer "I−1", and a matrix $X_j$ is formed according to equation (4), equation (5), and equation (6).

$$x_{jk} = (y_j + k) \bmod i \quad (4)$$

$$x_{jk} = i \quad (5)$$

$$X_j = \{x_{0k}, x_{1k}, x_{2k}, \ldots, x_{i-1k}\} \quad (6)$$

Equation (4) is obtained when the right-hand side [($y_j$+k) mod. i] is not "0". Equation (5) is obtained when the right-hand side [($y_j$+k)mod. i] is "0".

A numerical value of the right-hand side of the matrix $X_j$ formed as described above serves as a frequency hopping code. The code is converted into a frequency to be used to obtain a frequency hopping pattern.

As in the embodiment, when the number of frequencies to be used is "9", the frequency hopping pattern code is formed by the following procedure. The number i of frequencies to be used is "9". For this reason, as prime number q larger than "9" which is the number of frequencies to be used, "11" is selected. Furthermore, "2" is selected as the primitive element α. When the prime number q and the primitive element α are assigned to equation (1) and equation (2) to form a circulant matrix Z. The matrix Z is given as follows:

Z={1, 2, 4, 8, 5, 10, 9, 7, 3, 6}

Therefore, a number larger than "9", which is the number of frequencies to be used, is deleted from the matrix Z to form a matrix Y. In this case, since the number larger than "9", which is the number of frequencies to be used, is only "10", the matrix Y is given as follows:

Y={1, 2, 4, 8, 5, 9, 7, 3, 6}

According to equation (4), equation (5), and equation (6), the integer "0" to the integer "i−1" are added to elements {1, 2, 4, 8, 5, 9, 7, 3, 6} of the matrix Y as offsets, respectively. In this manner, a matrix $X_j$ (=$X_0, X_1, X_2, \ldots, X_8$) in which all the integers of the integer "1" to the number i of frequencies to be used appear only once is formed. The matrix $X_j$ (=$X_0, X_1, X_2, \ldots, X_8$) is given as follows:

$X_0$={1, 2, 4, 8, 5, 9, 7, 3, 6}
$X_1$={2, 3, 5, 9, 6, 1, 8, 4, 7}
$X_2$={3, 4, 6, 1, 7, 2, 9, 5, 8}
$X_3$={4, 5, 7, 2, 8, 3, 1, 6, 9}
$X_4$={5, 6, 8, 3, 9, 4, 2, 7, 1}
$X_5$={6, 7, 9, 4, 1, 5, 3, 8, 2}
$X_6$={7, 8, 1, 5, 2, 6, 4, 9, 3}
$X_7$={8, 9, 2, 6, 3, 7, 5, 1, 4}
$X_8$={9, 1, 3, 7, 4, 8, 6, 2, 5}

Any one right-hand side of the matrix $X_j$ (=$X_0, X_1, X_2, \ldots, X_8$) formed as described above is stored in the hopping pattern memory 22 as the frequency hopping pattern codes $x_{0k}$ to $x_{8k}$. The hopping pattern memory 22 is formed in the storage section 13 of the main body 10 of the interrogator. For example, any one frequency hopping pattern code $x_{0k}$ to $x_{8k}$ is downloaded from the host device connected to the hopping pattern memory 22 through the interface section 11 through a communication line to make it possible to store the frequency hopping pattern code $x_{0k}$ to $x_{8k}$ in the hopping pattern memory 22.

Figure 5:
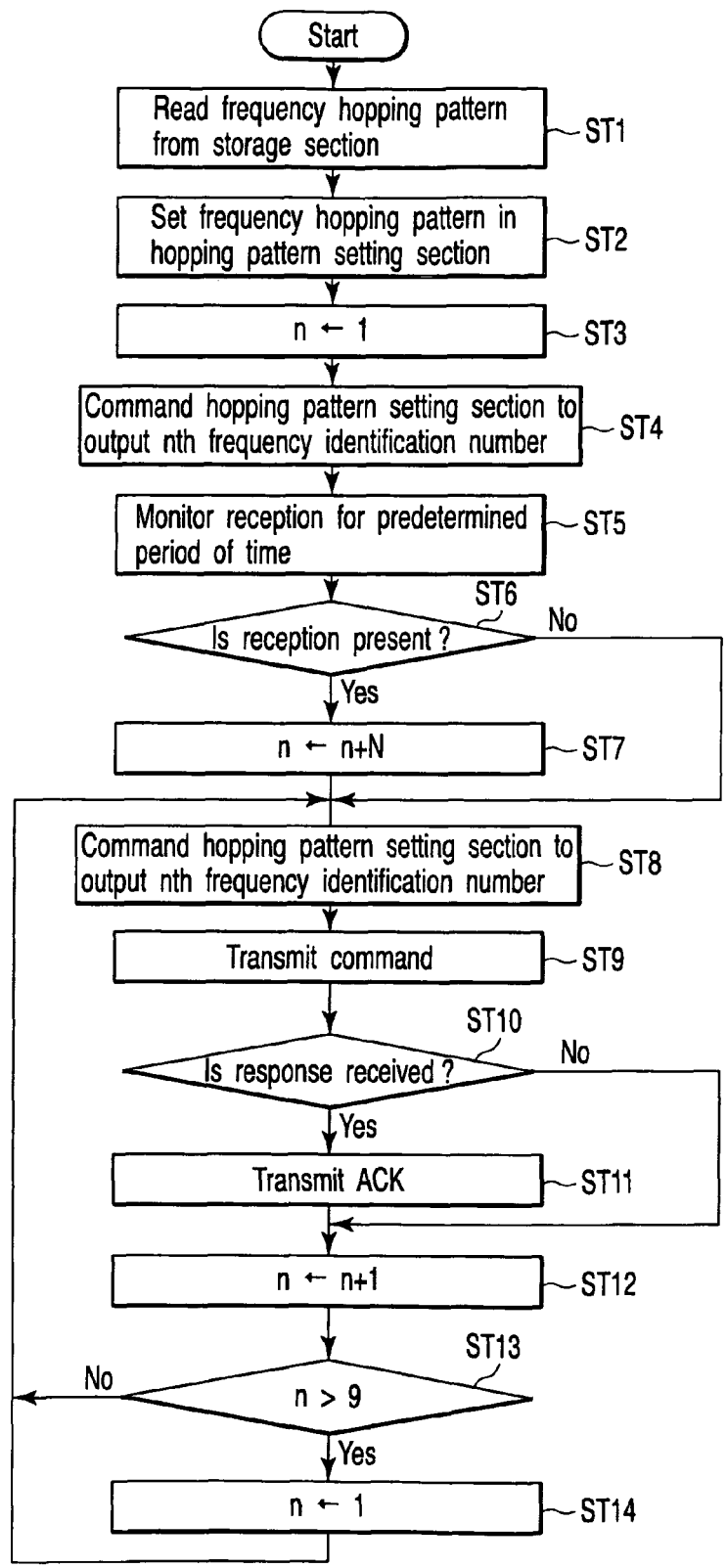
FIG. 5 is a flow chart showing a main control procedure executed by a control section of the interrogator.

A control procedure of the control section 12 will be described below with reference to the flow chart in FIG. 5. The control section 12 starts the operation when a start command is input from, for example, a host device to the control section 12 through the interface section 11.

The control section 12 reads the frequency hopping pattern code $x_{0k}$ to $x_{8k}$ stored in the hopping pattern memory 22 as step ST1. As step ST2, the read frequency hopping pattern codes $x_{0k}$ to $x_{8k}$ are set in the hopping pattern setting section 16.

The control section 12 sets a count value n of the cyclic counter memory 23 to "1" as step ST3. The control section 12 commands the hopping pattern setting section 16 to output an nth (n is equal to the count value n of the cyclic counter memory 23) frequency identification number as step ST4.

The hopping pattern setting section 16 which receives the command extracts an nth numerical value ($x_{0k}$ when n=1, $X_{1k}$ when n=2, . . . , $x_{8k}$ when n=9) from the left in the set frequency hopping pattern codes $x_{0k}$ to $x_{8k}$. The hopping pattern setting section 16 outputs the numerical value to the frequency oscillation section 17 as the frequency identification number.

The frequency oscillation section 17 searches the frequency conversion table 31 by the frequency identification number input from the hopping pattern setting section 16. The frequency oscillation section 17 reads frequency data F1 to F9 set in accordance with the frequency identification number and outputs the unmodulated signals of the frequencies f1 to f9 depending on the frequency data F1 to F9 to the transmission section 14 and the reception section 15.

The control section 12 monitors a receiving state in the reception section 15 for a predetermined period of time as step ST5. It is determined as step ST6 whether a reception signal is received in the period of time (reception determining means).

If a radio wave is received by the antenna 2, and if the reception signal is demodulated into receiving data by the reception section 15 and input to the control section 12, the control section 12 determines the presence of reception. In contrast to this, when receiving data is not input for a predetermined period of time, the control section 12 determines the absence of reception. Note that an input of receiving data means that another interrogator using a frequency of the unmodulated signal transmitted from the frequency oscillation section 17 to the reception section 15 is closed to the interrogator of the embodiment at the present.

When the presence of reception is determined (YES in step ST6), and the control section 12 adds a predetermined number N to a count value n of the cyclic counter memory 23 as step ST7. In this case, it is assumed that the predetermined number N is an arbitrary number which is equal to or larger than "2" and equal to or smaller than "(the number i of frequencies to be used)−1". When the absence of reception is determined (NO in step ST6), the control section 12 does not perform the process in step ST7.

The control section 12, as step ST8, as in step ST4, commands the hopping pattern setting section 16 to output the nth frequency identification number. As step ST9, command data corresponding to the RFID tag is output to the transmission section 14 (transmission start means).

In this manner, when the absence of reception is determined in step ST6, an unmodulated signal of a frequency at which reception is monitored in the process in step ST5 is continuously output to the transmission section 14. As a result, in the transmission section 14, an unmodulated wave of the unmodulated signal is modulated by command data given by the control section 12. The modulated signal is radiated from the antenna 2 as a radio wave.

On the other hand, when the presence of reception is determined in step ST6, an unmodulated signal of a frequency different from a frequency at which reception is monitored in the process in ST5 is output to the transmission section 14. As a result, in the transmission section 14, an unmodulated wave of the unmodulated signal is modulated by the command data given by the control section 12. The modulated signal is radiated from the antenna 2 as a radio wave.

After a command is transmitted to the RFID tag, the control section 12 determines as step ST10 whether a response signal from the RFID tag is received. When the response signal is received (YES in ST10), the control section 12 outputs command data of an ACK response to the transmission section 14 as ST11 to shift to the process in step ST12. When no response signal is received (NO in step ST10), the control section 12 shifts to the process in step ST12 without outputting the command data of the ACK response.

In step ST12, the control section 12 increments the count value n of the cyclic counter memory 23 by "1".

The control section 12 determines as step ST13 whether the count value n exceeds "9", which is the number of frequencies to be used. When the count number n does not exceed "9", which is the number of frequencies to be used (NO in step ST13), the control section 12 returns to the process in step ST8. When the count value n exceeds "9", which is the number of frequencies to be used (YES in step ST13), the control section 12 returns the count value n of the cyclic counter memory 23 to "1" as step ST14, and returns to the process in step ST8.

Thereafter, the control section 12 repeatedly executes the following processes 1 to 4.
1. The control section 12 commands the hopping pattern setting section 16 to output the nth frequency identification number.
2. The control section 12 transmits command data corresponding to an RFID tag.
3. The control section 12 monitors whether a response signal from the RFID tag is received.
4. When the control section 12 receives the response signal, the control section 12 transmits command data of an ACK response to increment the count value n of the cyclic counter memory 23.

Figure 6:
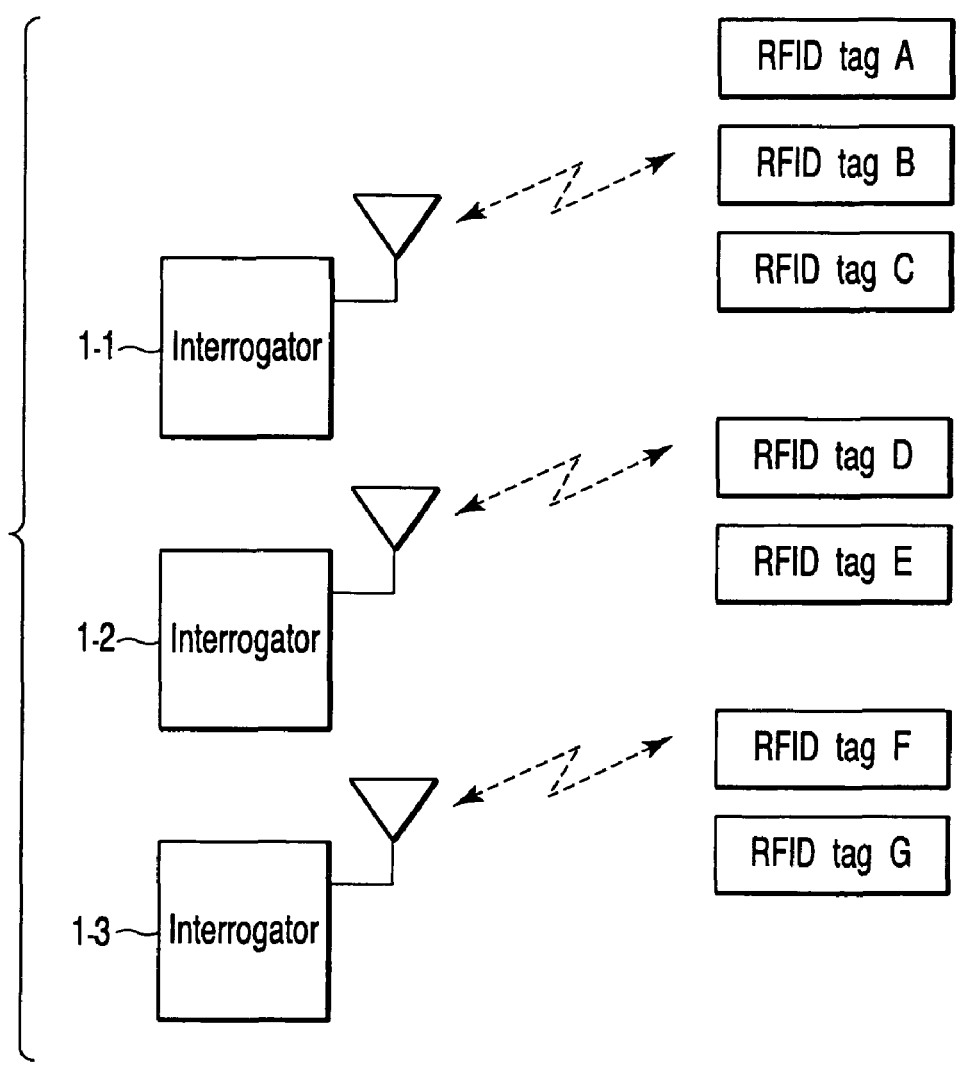
FIG. 6 is a pattern diagram showing an example of an RFID system using an interrogator according to the present invention.

An operation and an effect of the embodiment will be described below by using the RFID system shown in FIG. 6 as an example. This RFID system is constituted by three interrogators 1-1, 1-2, and 1-3 and seven RFID tags A to G. The three interrogators 1-1, 1-2, and 1-3 are arranged in proximity to each other. The first interrogator 1-1 communicates with the three RFID tags A, B, and C. The second interrogator 1-2 communicates with other two RFID tags D and E. The third interrogator 1-3 communicates with the remaining two RFID tags F and G.

First, as initial conditions, in each of the hopping pattern memories 22 of the first to third interrogators 1-1, 1-2, and 1-3, hopping pattern codes of a matrix $X_0=\{1, 2, 4, 8, 5, 9, 7, 3, 6\}$, a matrix $X_1=\{2, 3, 5, 9, 6, 1, 8, 4, 7\}$, and a matrix $X_2=\{3, 4, 6, 1, 7, 2, 9, 5, 8\}$ are stored. In each of the frequency conversion tables 31 of the first to third interrogators 1-1 to 1-3, as shown in FIG. 3, the frequency data F1 to F9 are set in accordance with the frequency identification numbers 1 to 9, respectively. The frequency data F1 to F9 correspond to the frequencies f1 to f9, respectively.

Figure 7:
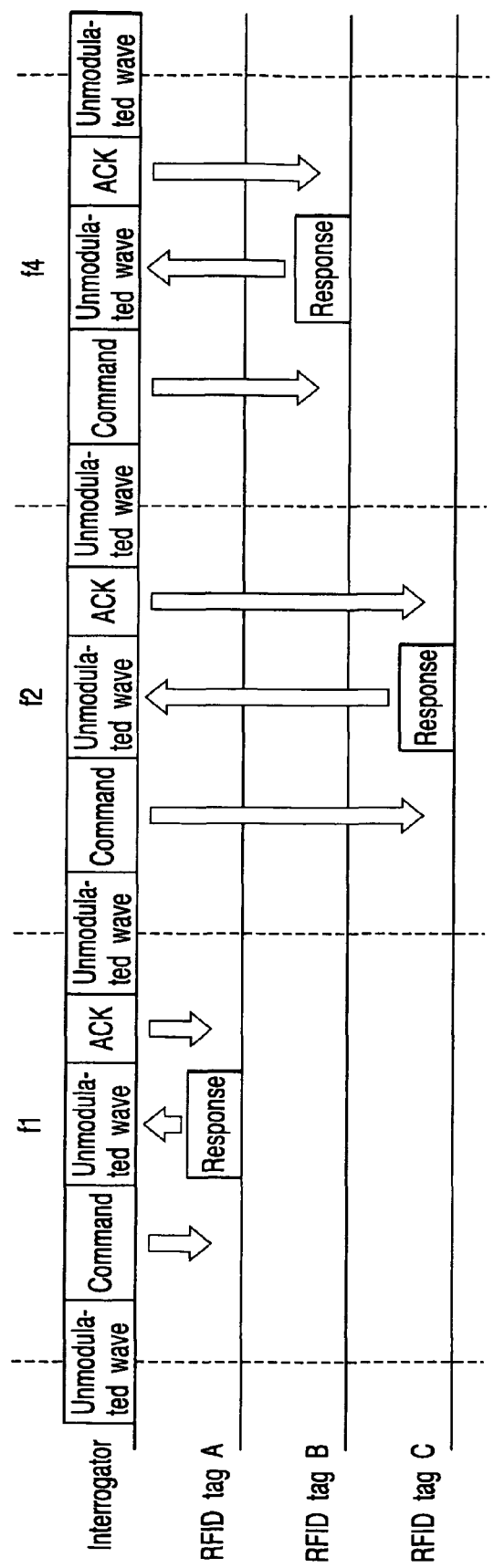
FIG. 7 is a timing chart showing an outline of a procedure in which the interrogator communicates with RFID tags A, B, and C in an RFID system.

An outline of a procedure in which the first interrogator 1-1 communicates with the RFID tags A, B, and C will be described below with reference to the timing chart in FIG. 7. In FIG. 7, an abscissa indicates a time axis, and frequencies change to the right with an elapse of time.

The first interrogator 1-1 selects the first frequency f1 first. An unmodulated wave using the frequency f1 as a radio frequency is transmitted from the antenna 2 to the outside.

The first interrogator 1-1 transmits a command to the RFID tag A from the antenna 2. After the command is transmitted, the first interrogator 1-1 retransmit the unmodulated wave of the frequency f1 and waits for a response from the RFID tag A.

When the RFID tag A receives the command, the RFID tag A performs so-called backscatter modulation which returns a response while receiving the unmodulated wave.

When the first interrogator 1-1 receives a response from the RFID tag A, the first interrogator 1-1 transmits an ACK response command to the RFID tag A. After the ACK response command is transmitted, the first interrogator 1-1 switches a communication frequency to the second frequency f2. An unmodulated wave using the frequency f2 as a radio frequency is transmitted from the antenna 2 to the outside.

Thereafter, the first interrogator 1-1 transmits a command to the RFID tag C. Subsequently, the first interrogator 1-1 retransmits the unmodulated wave of the frequency f2. The RFID tag C which receives the command performs backscatter modulation.

When the first interrogator 1-1 receives a response from the RFID tag C, the interrogator 1-1 transmits an ACK response command to the RFID tag C. Thereafter, the first interrogator 1-1 switches the communication frequency to the third frequency f4, and transmits the unmodulated wave using the frequency f4 as a radio frequency from the antenna 2 to the outside.

Thereafter, the interrogator 1-1 transmits a command to the RFID tag B. Subsequently, the first interrogator 1-1 retransmits the unmodulated wave of the frequency f4. The RFID tag B which receives the command performs backscatter modulation.

When the first interrogator 1-1 receives a response from the RFID tag B, the interrogator 1-1 transmits an ACK response command to the RFID tag B. Thereafter, the first interrogator 1-1 switches the communication frequency to the fourth frequency f8, and transmits the unmodulated wave using the frequency f8 as a radio frequency from the antenna 2 to the outside.

The other interrogators 1-2 and 1-3 communicate with RFID tags by the same procedure as that of the first interrogator 1-1.

In this manner, the interrogators 1-1 to 1-3 communicate with the RFID tags A to G while sequentially switching frequencies depending on preset frequency hopping patterns. In FIG. 7, frequencies are switched each time the interrogator communicates one RFID tag. However, a timing at which the frequencies are switched is not limited to the above timing. In simultaneous communication with a plurality of RFID tags, a known collision avoidance protocol such as an Aloha protocol or a binary search algorithm may be used.

Since each of the interrogators 1-1 to 1-3 uses a limited frequency band, the interrogator cannot perform transmission/reception at a frequency except for a set frequency. However, each of the RFID tags A to G is designed to perform transmission/reception at all the frequencies f1 to f9 used by the interrogators 1-1, 1-2, and 1-3. Therefore, the frequency hopping pattern is arbitrarily set, and the interrogators 1-1 to 1-3 can communicate with the RFID tags A to G.

Figure 8:
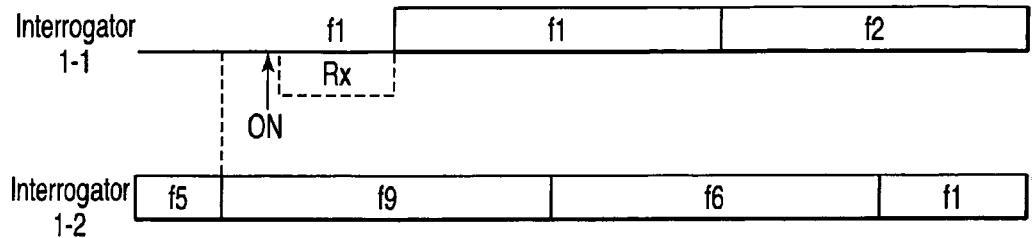
FIG. 8 is a pattern diagram showing frequency hopping operations in a first interrogator and a second interrogator when a frequency at which the first interrogator starts communication is different from that of the second interrogator adjacent to the first interrogator in the RFID system in FIG. 6.

As shown in FIG. 8, it is assumed that, in a state in which the second interrogator 1-2 performs communication at the frequency f9 of the frequency data F9 corresponding to the fourth value "9" of a frequency hopping pattern code {2, 3, 5, 9, 6, 1, 8, 4, 7} set in the interrogator 1-2, the first interrogator 1-1 adjacent to the interrogator 1-2 is started at a point in time indicated by ON in FIG. 8.

In this manner, in the first interrogator 1-1, reception is performed for a predetermined period of time Rx at the frequency f1 of the frequency data F1 corresponding to the first value "1" of a frequency hopping pattern code {1, 2, 4, 8, 5, 9, 7, 3, 6} set in the interrogator 1-1. In this case, since another interrogator which uses the frequency f1 is not present near the interrogator 1-1, data is not received. Therefore, the interrogator 1-1 starts at the frequency f1 at which the reception is performed, without changing the frequency.

Figure 9:
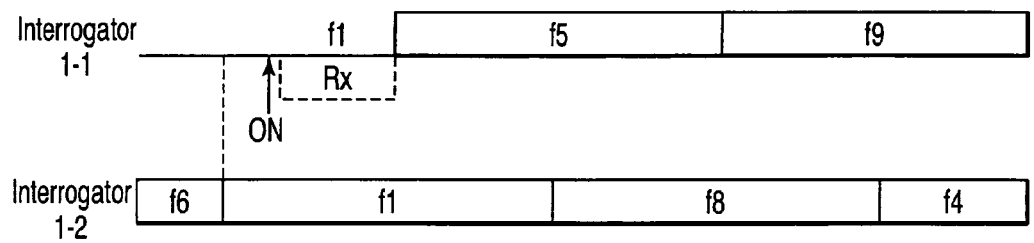
FIG. 9 is a pattern diagram showing the frequency hopping operations of the first interrogator and the second interrogator when the frequency at which the first interrogator starts communication is equal to that of the second interrogator adjacent to the first interrogator in the RFID system in FIG. 6.

In contrast to this, as shown in FIG. 9, in a state in which the second interrogator 1-2 performs communication at the frequency f1, when the first interrogator 1-1 is started at the point in time indicated by ON in FIG. 9, for a predetermined reception period Rx, a radio wave having the frequency f1 transmitted from the second interrogator 1-2 is received by the first interrogator 1-1. In this case, if a predetermined number N is defined as "4", the first interrogator 1-1 starts transmission at the frequency f5 of the frequency data F5 corresponding to the fifth value "5" of the frequency hopping pattern code {1, 2, 4, 8, 5, 9, 7, 3, 6}.

In this manner, at the start of the first interrogator 1-1, the first interrogator 1-1 is controlled such that the first interrogator 1-1 is started at a frequency except for the frequency used by the second interrogator 1-2 adjacent to the first interrogator 1-1. For this reason, interference does not occur at the start of the first interrogator 1-1. Therefore, the first interrogator 1-1 can be stably started. The same goes for the start of the other interrogator 1-2 or 1-3. Therefore, interference caused when a given interrogator is started at a frequency which is being used by another interrogator can be prevented.

In this case, the predetermined number N is set to an arbitrary value which is equal to or larger than "2" and equal to or smaller than a value smaller than "(the number i of frequencies to be used)−1". Therefore, transmission is started at any frequency except for a frequency at which reception is performed and a frequency adjacent to the frequency for reception in the frequency hopping pattern.

Figure 10:
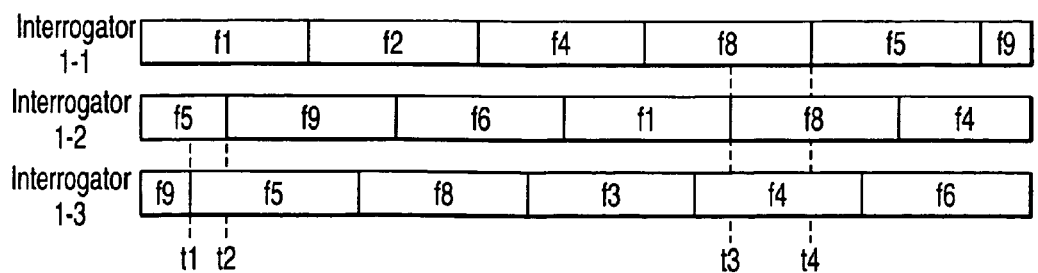
FIG. 10 is a pattern diagram showing an example of frequency hopping operations of the first to third interrogators in the RFID system in FIG. 6.

An example of frequency hopping performed when all the three interrogators 1-1, 1-2, and 1-3 perform communication is shown by the timing chart in FIG. 10.

As shown in FIG. 10, in the first interrogator 1-1 in which the hopping pattern code of the matrix $X_0=\{1, 2, 4, 8, 5, 9, 7, 3, 6\}$ is set, communication is performed by a hopping operation in which frequencies are switched in the order of f1, f2, f4, f8, f5, f9, f7, f3, f6, and f1.

In the second interrogator 1-2 in which the hopping pattern code of the matrix $X_1=\{2, 3, 5, 9, 6, 1, 8, 4, 7\}$, communication is performed by a hopping operation in which frequencies are switched in the order of f2, f3, f5, f9, f6, f1, f8, f4, f7, and f2.

In the third interrogator 1-3 in which the hopping pattern code of the matrix $X_2=\{3, 4, 6, 1, 7, 2, 9, 5, 8\}$, communication is performed by a hopping operation in which frequencies are switched in the order of f3, f4, f6, f1, f7, f2, f9, f5, f8, and f3.

In this case, it is assumed that, at a point of time t1 while the second interrogator 1-2 uses the frequency f5, the third interrogator 1-3 starts the use of the frequency f5. In this case, the second interrogator 1-2 and the third interrogator 1-3 use the same frequency f5, the interrogators interfere with each other. However, the second interrogator 1-2 performs frequency hopping at time t2 after time has elapsed to switch the frequency to be used to the frequency f9. As a result, interference does not occur.

Similarly, it is assumed that, at a point of time t3 while the first interrogator 1-1 uses the frequency f8, the second interrogator 1-2 starts the use of the frequency f8. Also in this case, the second interrogator 1-2 and the first interrogator 1-1 interfere with each other. However, the first interrogator 1-1 performs frequency hopping at time t4 after time has elapsed to switch the frequency to be used to the frequency f5. For this reason, interference does not occur.

In this manner, the embodiment, a frequency hopping pattern in which the number of frequencies to be used is "9", i.e., is not "(prime number)−1" is used. In this case, as frequencies used in the interrogators 1-1 to 1-3 are made different from each other for a short period of time, interference can be minimized.

Second Embodiment

A second embodiment of the present invention will be described below. In the second embodiment, the present invention is applied to an interrogator 1 having the same configuration as that in the first embodiment. The same reference numerals as in the first embodiment denote the same parts in the second embodiment, and a description thereof will be omitted.

The second embodiment is different from the first embodiment in the contents of the hopping pattern memory 22. More specifically, in the first embodiment, when the number of frequencies to be used is "9", the right-hand side of any one of a matrix $X_j$ ($=X_0, X_1, X_2, \ldots, X_8$) formed by the forming procedure described above is stored in the hopping pattern memory 22 as frequency hopping pattern codes $x_{0k}$ to $x_{8k}$. The control section 12 reads the frequency hopping pattern codes $x_{0k}$ to $x_{8k}$ stored in the hopping pattern memory 22 (ST1 in FIG. 5) and sets the frequency hopping pattern codes $x_{0k}$ to $x_{8k}$ in the hopping pattern setting section 16 (ST2 in FIG. 5).

In contrast to this, in the second embodiment as shown in FIG. 11, all the right-hand sides of the matrix $X_j$ ($=X_0, X_1, X_2, \ldots, X_8$) are stored in the hopping pattern memory 22 as frequency hopping pattern codes $x_{00}$ to $x_{80}$, $x_{01}$ to $x_{81}$, $x_{02}$ to $x_{82}$, $x_{03}$ to $x_{83}$, $x_{04}$ to $x_{84}$, $x_{05}$ to $x_{85}$, $x_{06}$ to $x_{86}$, $x_{07}$ to $x_{87}$, $x_{08}$ to $x_{88}$.

Figure 12:
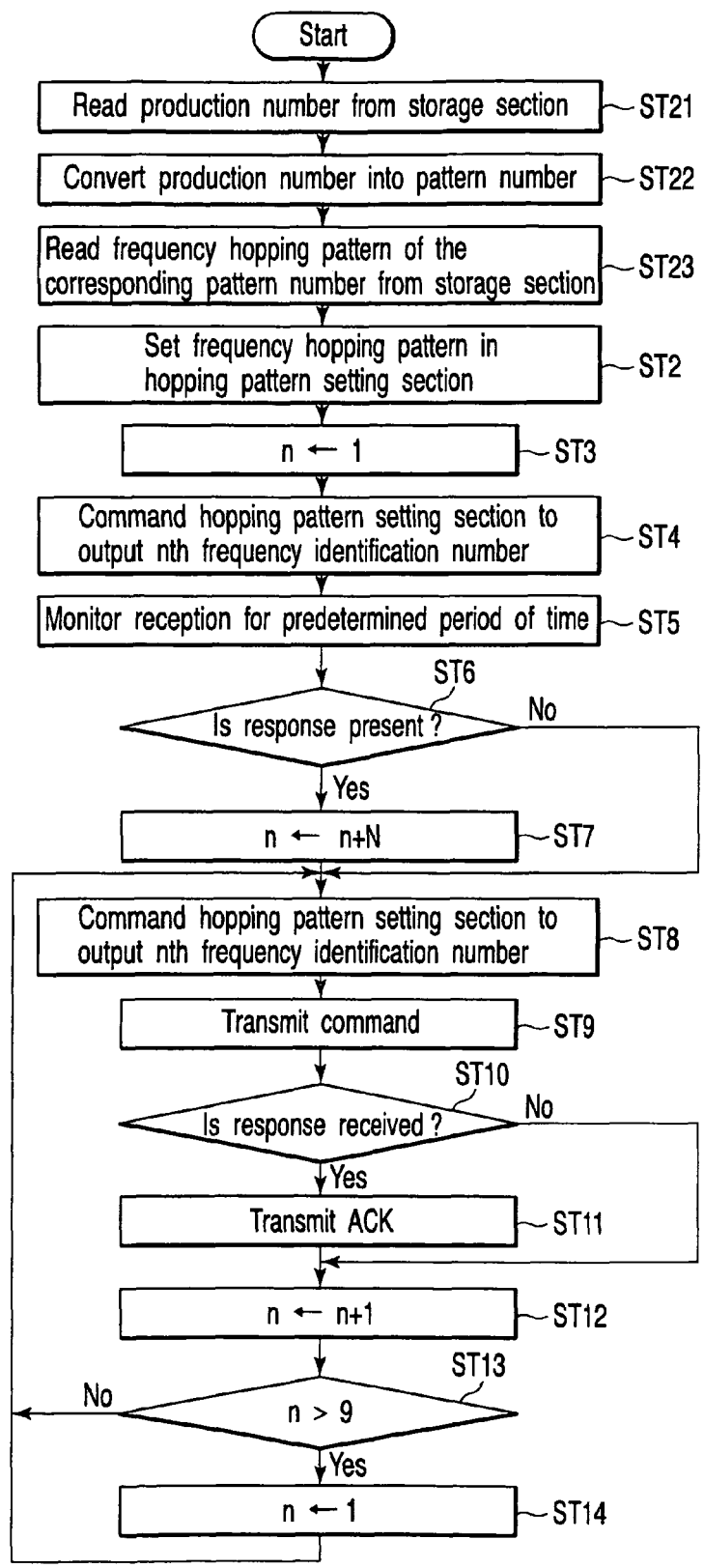
FIG. 12 is a flow chart showing a main control procedure executed by a control section in the second embodiment.

In this manner, a control section 12 controls the respective section by a procedure shown in the flow chart in FIG. 12.

More specifically, when the control is started, first, as step ST21, a production number stored in a product number memory 21 of a storage section 13 is read. As step ST22, the production number is converted into any one of values of patterns 0 to 8 in a hopping pattern memory 22.

As an example, the production number is divided by "9", which is the number of patterns, to calculate a remainder. For example, when the production number is "77", the remainder is "5". For this reason, it is regarded that the production number "77" is converted into a pattern "5". Similarly, when the production number is "78", the remainder is "6". For this reason, it is regarded that the production number "78" is converted into a pattern "6".

Thereafter, the control section 12, as step ST23, selectively reads a frequency hopping pattern code of the pattern number converted from the production number from the hopping pattern memory 22. As in the processing procedure in step ST2 in the first embodiment, the read frequency hopping pattern code is set in the hopping pattern setting section 16 (pattern selection means). Subsequently, the same processing procedures as the processing procedures in steps ST3 to ST14 in the first embodiment are executed.

An operation and an effect in the second embodiment having the above configuration will be described below with reference to FIG. 6. As initial conditions, a production number of the first interrogator 1-1 is set to "99", a production number of the second interrogator 1-2 is set to "100", and a production number of the third interrogator 1-3 is set to "101".

In this case, in the first interrogator 1-1, since a remainder obtained by dividing the production number "99" by the number of patterns "9" is "0", a hopping pattern code {1, 2, 4, 8, 5, 9, 7, 3, 6} corresponding to pattern 0 is set in the hopping pattern setting section 16.

Similarly, in the second interrogator 1-2, since a remainder obtained by dividing the production number "100" by the number of patterns "9" is "1", a hopping pattern code {2, 3, 5, 9, 6, 1, 8, 4, 7} corresponding to pattern 1 is set in the hopping pattern setting section 16. In the third interrogator 1-3, since a remainder obtained by dividing the production number "101" by the number of patterns "9" is "2", a hopping pattern code {3, 4, 6, 1, 7, 2, 9, 5, 8} corresponding to pattern 2 is set in the hopping pattern setting section 16. Therefore, the same operation and effect as those in the first embodiment can be achieved.

In addition, in the second embodiment, an operation in which different hopping pattern codes are stored between the interrogators 1-1 and 1-2 or the interrogators 1-2 and 1-3 when the interrogators 1-1 to 1-3 are installed is not necessary. Therefore, this has an effect of reducing the effort required for the installing operation.

When a plurality of interrogators 1 are installed in a limited region, the interrogators 1 having sequential serial production numbers tend to be installed in proximity to each other. For example, it is assumed that an interrogator 1-77 having a production number "77" and an interrogator 1-78 having a production number "78" are installed in proximity to each other. In this case, in the interrogator 1-77, a frequency hopping pattern code of pattern 5 is selected. In the interrogator 1-78, a frequency hopping pattern code of pattern 6 is selected.

In this case, the interrogator 1-77 in which the frequency hopping pattern code of pattern 5 is selected and the interrogator 1-78 in which the frequency hopping pattern code of pattern 6 is selected may always continuously use adjacent frequencies depending on timings of frequency hopping. In this case, interference may occur even though the adjacent frequencies are used.

Third Embodiment

A third embodiment will be described below.

Figure 13:
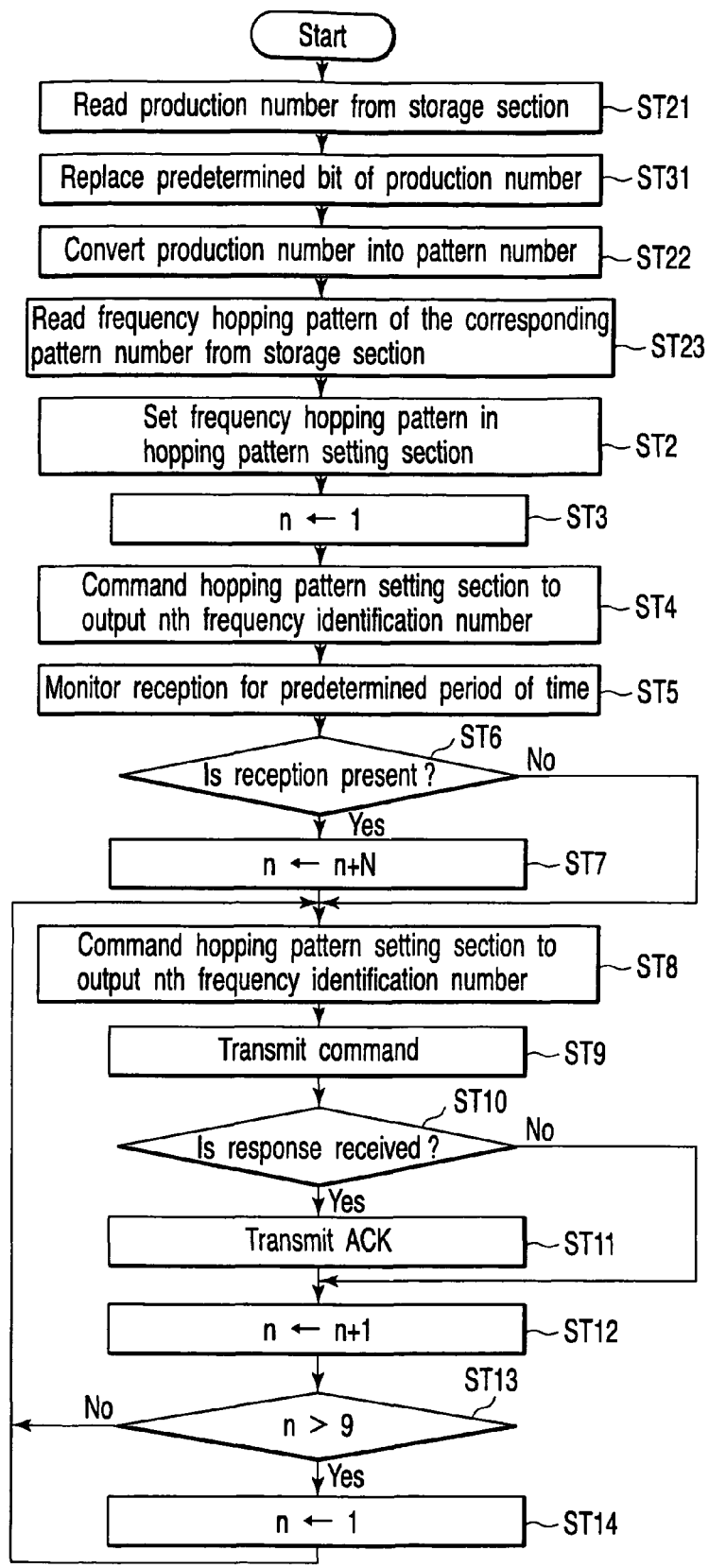
FIG. 13 is a flow chart showing a main control procedure executed by a control section in a third embodiment.

In the third embodiment, as shown in the flow chart in FIG. 13, a process of replacing predetermined bits of a production number read from the product number memory 21 is added as step ST31 between the processes of step ST21 and ST23 in the second embodiment. Except for this, the third embodiment has the same configuration as that of the second embodiment. For this reason, the same reference numerals as in the second embodiment denote the same parts in the third embodiment, and a description thereof will be omitted.

An example of the bit replacement will be described below with reference to FIG. 14. FIG. 14 shows a case in which, in each of the production numbers "77" and "78" expressed by 8 bits, a first lower bit and a third lower bit are replaced with each other, and a second lower bit and a fourth lower bit are replaced with each other. In this case, with respect to "77", 8-bit data "01001101" becomes "01000111". In the decimal system, the data is given by 71. For this reason, the interrogator 1-77 selects pattern 8 corresponding to "8", which is a remainder obtained by dividing "71" by the number of patterns "9". On the other hand, with respect to the production number "78", 8-bit data "01001110" becomes "01001011". In the decimal system, the data is given by 75. For this reason, the interrogator 1-78 selects pattern 3 corresponding to "3", which is a remainder obtained by dividing "75" by the number of patterns "9". Therefore, even in the interrogator 1-77 and the interrogator 1-78 having serial production numbers, a defect which continues a state in which adjacent frequencies are always continuously used can be prevented.

In the second and third embodiments, as a unique identification information of each interrogator 1, any one of the frequency hopping pattern codes is selected from the hopping pattern memory 22 on the basis of a production number. However, the frequency hopping pattern code can also be selected on the basis of unique information except for the production number. For this reason, when the interrogator 1 uses a MAC (Media Access Control) address, the MAC address may be used in place of a production number. In short, different data simply need to be used in different interrogators 1, respectively.

In the second and third embodiment, all the right-hand sides of a matrix $X_j$ (=$X_0, X_1, X_2, \ldots, X_8$) are stored in the hopping pattern memory 22 as frequency hopping pattern codes $x_{00}$ to $x_{80}$, $x_{01}$ to $x_{81}$, $x_{02}$ to $x_{82}$, $x_{03}$ to $x_{83}$, $x_{04}$ to $x_{84}$, $x_{05}$ to $x_{85}$, $x_{06}$ to $x_{86}$, $x_{07}$ to $x_{87}$, $x_{08}$ to $x_{88}$ of patterns 0 to 8. However, at least two frequency hopping pattern codes may be stored in the hopping pattern memory 22, and any one of the frequency hopping pattern codes may be selected on the basis of data changing, depending on the interrogators 1. In this case, for example, when two frequency hopping pattern codes are to be stored, adjacent patterns such as a matrix $X_1$ and a matrix $X_2$ or a matrix $X_3$ and a matrix $X_4$ are not used, but patterns such as the matrix $X_1$ and the matrix $X_3$ or the matrix $X_1$ and the matrix $X_4$ which are not adjacent to each other are preferably used.

In the third embodiment, the bit replacing method is not limited to the method of the embodiment, as a matter of course. However, when only a first lower bit and a second lower bit are replaced with each other, for example, in the example shown in FIG. 14, the production number "77" is only changed into "78", and "78" is only changed into "77". As a result, other conditions are not changed. For this reason, this method should not be applied.

Fourth Embodiment

In the explanations in the first to third embodiments, the available frequencies are 9 channels of the frequencies f1 to f9, and all the frequencies are used. However, the present invention is not limited to this. For example, as shown in FIG. 15, it is assumed that the available frequencies are 18 channels of frequencies f1 to f18, and that the number of frequencies to be used is "9". In this case, a frequency hopping pattern which uses the 9 lower frequencies f1 to f9 bound by LF in FIG. 15 and a frequency hopping pattern which uses the 9 higher frequencies f10 to f18 bound by HF in FIG. 15 may be used.

Therefore, a interrogator 1 using a frequency hopping pattern which uses the 9 lower frequencies f1 to f9 of the frequencies f1 to f18 of the 18 available channels and a frequency hopping pattern which uses the 9 higher frequencies f10 to f18 will be described below as a fourth embodiment.

In the fourth embodiment, in a storage section 13, as shown in FIG. 16, a frequency conversion table memory 24 and a level information memory 25 are arranged.

In the frequency conversion table memory 24, data F1 to F9 of the 9 lower frequencies f1 to f9 of the frequencies f1 to f18 of the 18 available channels, and data F10 to F18 of the 9 higher frequencies f10 to f18 are set in one-to-one correspondence with the frequency identification numbers 1 to 9.

In the level information memory 25, frequency level information given by data "L" or "H" is stored. The frequency level information "L" is information designating that the 9 lower frequencies f1 to f9 are selected. The frequency level information "H" is information designating that the 9 higher frequencies f10 to f18 are selected. In the level information memory 25, the frequency level information "L" or "H" is arbitrarily set through a communication line by a host device connected to the level information memory 25 through an interface section 11.

A control section 12 first reads the frequency level information from the level information memory 25 of the storage section 13 as step ST41. Next, the control section 12 analyzes the frequency level information as step ST42. When the frequency level information is "L", the data F1 to F9 corresponding to the 9 lower frequencies f1 to f9 are read from the frequency conversion table memory 24. On the other hand, when the frequency level information is "H", data F10 to F18 corresponding to the 9 higher frequencies f10 to f18 are read from the frequency conversion table memory 24.

The control section 12 sets the data read from the frequency conversion table memory 24 in a frequency conversion table 31 of a frequency oscillation section 17 as step ST43. Thereafter, the control section 12 shifts to the first process step in each of the first to third embodiments. More specifically, the control section 12 shifts to the process in step ST1 in FIG. 5 in the first embodiment, the control section 12 shifts to the process in step ST21 in FIG. 12 in the second embodiment, and the control section 12 shifts to the process in step ST21 in FIG. 13 in the third embodiment.

In the fourth embodiment having the above configuration, for example, the frequency level information "L" is stored in one of two adjacent interrogators 1-1 and 1-2, and the frequency level information "H" is stored in the other interrogator. In this manner, since the same frequency is not used in the interrogators 1-1 and 1-2, interference can be reliably prevented.

When the number of available frequencies is larger than the number of frequencies to be used, some of the available frequencies may be occupied by another radio transceiver. FIG. 18 shows a case in which, of 11 channels of available frequencies f1 to f11, specific frequencies f5 and f8 are occupied by another radio transceiver.

In this case, as in the first embodiment, when the number of frequencies to be used is "9", as shown in FIG. 19, F10 and F11 are set as frequency data of a frequency conversion table 31 in place of F5 and F8. In this manner, even though the frequencies used by the other transceiver are not used, frequencies different from each other are obtained by frequency hopping within a short period of time. For this reason, interference between the interrogators can be reduced.

In each of the embodiments, the frequency hopping pattern codes $x_{0k}$ to $x_{8k}$ are formed by a matrix in which all integers of an integer "1" to a prime number "q−1" larger than the number of frequencies to be used appear only once. The matrix used in formation of the frequency hopping pattern codes $x_{0k}$ to $x_{8k}$ is not limited to the matrix in the embodiments. A matrix in which all integers of an integer "1" to an integer "$q^m-1$" of the power of a prime number q larger than the number of frequencies to be used appear only once may also be used.

Fifth Embodiment

Therefore, a fifth embodiment in which a frequency hopping pattern code is formed by using a matrix in which all integers of an integer "1" to an integer "$q^m-1$" of the power of a prime number q larger than the number of frequencies to be used appear only once will be described below.

First, when an integer $q^m$ of the power of a prime number is used, a primitive element α is defined by a polynomial equation. The number i of available frequencies is set to "23", an exponent of a power is given by m=2, and "25" (q=5) is selected as an integer $q^2$ of the power of a prime number larger than i.

As the primitive element α, a value which satisfies equation (7) is selected.

$$\alpha^2 + 4\alpha + 2 = 0 \quad (7)$$

In equation (7), $\alpha^0$ is "1", $\alpha^1$ is "α", and $\alpha^2$ is "−4α−2". Since $\alpha^3$ is $\alpha^2 \times \alpha$, $\alpha^3$ is "−4α²−2α". However, $\alpha^3$ is set at "14α+8" by equation (8) such that the power of α is not included in the right-hand side.

$$\begin{aligned}\alpha^3 &= 4\alpha^2 - 2\alpha \\ &= -4(-4\alpha - 2) - 2\alpha \\ &= 14\alpha + 8\end{aligned} \quad (8)$$

When $\alpha^0$, $\alpha^1$, $\alpha^2$, $\alpha^3$, . . . derived as described above are assigned to the equation (1), the following equations are obtained:

$z_0 = \alpha^0 \bmod. 5 = 1$ $z_1 = \alpha^1 \bmod. 5 = \alpha$ $z_2 = \alpha^0 \bmod. 5 = -4\alpha - 2$ $z_3 = \alpha^3 \bmod. 5 = (14\alpha + 8) \bmod. 5 = 4\alpha + 3$ $z_4 = \alpha^4 \bmod. 5 = -3\alpha - 3$ (Z5 to Z22 are omitted)

$z_{23} = \alpha^{23} \bmod. 5 = -3\alpha - 2$

The results obtained by assigning the values to equation (1) are expressed as [Table 1]. In [Table 1], a term "n" denotes integers of "0" to "23". A term "α" denotes a coefficient obtained by ignoring negative and positive signs in the term α. A term "α⁰" denotes a coefficient obtained by ignoring negative and positive signs in term "α⁰". A term "decimal number" denotes a value obtained when α=5 in the decimal system.

TABLE 1

| n | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|----|----|----|----|----|----|----|----|----|----|----|----|----|----|
| α | 0 | 1 | 4 | 4 | 3 | 4 | 0 | 3 | 2 | 2 | 4 | 2 | 0 | 4 | 1 | 1 | 2 | 1 | 0 | 2 | 3 | 3 | 1 | 3 |
| α0 | 1 | 0 | 2 | 3 | 3 | 1 | 3 | 0 | 1 | 4 | 4 | 3 | 4 | 0 | 3 | 2 | 2 | 4 | 2 | 0 | 4 | 1 | 1 | 2 |
| Decimal number | 1 | 5 | 22 | 23 | 18 | 21 | 3 | 15 | 11 | 14 | 24 | 13 | 4 | 20 | 8 | 7 | 12 | 9 | 2 | 10 | 19 | 16 | 6 | 17 |

According to the [Table 1], the circulant matrix Z is as follows:

Z={1, 5, 22, 23, 18, 21, 3, 15, 11, 14, 24, 13, 4, 20, 8, 7, 12, 9, 2, 10, 19, 16, 6, 17}.

"24" is larger than "23", which is larger than the number of available frequencies, are deleted in the matrix Z to form the following matrix Y.

Y={1, 5, 22, 23, 18, 21, 3, 15, 11, 14, 13, 4, 20, 8, 7, 12, 9, 2, 10, 19, 16, 6, 17}

According to the equation (4), equation (5), and equation (6), integers from "0" to "i−1" are added to the elements {1, 5, 22, 23, 18, 21, 3, 15, 11, 14, 13, 4, 20, 8, 7, 12, 9, 2, 10, 19, 16, 6, 17} of the matrix Y, as an offset, respectively, to form a matrix $X_j$ (=$X_0, X_1, X_2, \ldots, X_{22}$) in which all the integers of the integer "1" to the number of frequencies to be used appear only once. In this case, the matrix $X_j$ (=$X_0, X_1, X_2, \ldots, X_{22}$) is as follows:

$X_0$={1, 5, 22, 23, 18, 21, 3, 15, 11, 14, 13, 4, 20, 8, 7, 12, 9, 2, 10, 19, 16, 6, 17}

$X_1$={2, 6, 23, 1, 19, 22, 4, 16, 12, 15, 14, 5, 21, 9, 8, 13, 10, 3, 11, 20, 17, 7, 18}

$X_2$={3, 7, 1, 2, 20, 23, 5, 17, 13, 16, 15, 6, 22, 10, 9, 14, 11, 4, 12, 21, 18, 8, 19}

$X_3$={4, 8, 2, 3, 21, 1, 6, 18, 14, 17, 16, 7, 23, 11, 10, 15, 12, 5, 13, 22, 19, 9, 20}

$X_4$={5, 9, 3, 4, 22, 2, 7, 19, 15, 18, 17, 8, 1, 12, 11, 16, 13, 6, 14, 23, 20, 10, 21}

$X_5$={6, 10, 4, 5, 23, 3, 8, 20, 16, 19, 18, 9, 2, 13, 12, 17, 14, 7, 15, 1, 21, 11, 22}

$X_6$={7, 11, 5, 6, 1, 4, 9, 21, 17, 20, 19, 10, 3, 14, 13, 18, 15, 8, 16, 2, 22, 12, 23}

$X_7$={8, 12, 6, 7, 2, 5, 10, 22, 18, 21, 20, 11, 4, 15, 14, 19, 16, 9, 17, 3, 23, 13, 1}

$X_8$={9, 13, 7, 8, 3, 6, 11, 23, 19, 22, 21, 12, 5, 16, 15, 20, 17, 10, 18, 4, 1, 14, 2}

$X_9$={10, 14, 8, 9, 4, 7, 12, 1, 20, 23, 22, 13, 6, 17, 16, 21, 18, 11, 19, 5, 2, 15, 3}

$X_{10}$={11, 15, 9, 10, 5, 8, 13, 2, 21, 1, 23, 14, 7, 18, 17, 22, 19, 12, 20, 6, 3, 16, 4}

$X_{11}$={12, 16, 10, 11, 6, 9, 14, 3, 22, 2, 1, 15, 8, 19, 18, 23, 20, 13, 21, 7, 4, 17, 5}

$X_{12}$={13, 17, 11, 12, 7, 10, 15, 4, 23, 3, 2, 16, 9, 20, 19, 1, 21, 14, 22, 8, 5, 18, 6}

$X_{13}$={14, 18, 12, 13, 8, 11, 16, 5, 1, 4, 3, 17, 10, 21, 20, 2, 22, 15, 23, 9, 6, 19, 7}

$X_{14}$={15, 19, 13, 14, 9, 12, 17, 6, 2, 5, 4, 18, 11, 22, 21, 3, 23, 16, 1, 10, 7, 20, 8}

$X_{15}$={16, 20, 14, 15, 10, 13, 18, 7, 3, 6, 5, 19, 12, 23, 22, 4, 1, 17, 2, 11, 8, 21, 9}

$X_{16}$={17, 21, 15, 16, 11, 14, 19, 8, 4, 7, 6, 20, 13, 1, 23, 5, 2, 18, 3, 12, 9, 22, 10}

$X_{17}$={18, 22, 16, 17, 12, 15, 20, 9, 5, 8, 7, 21, 14, 2, 1, 6, 3, 19, 4, 13, 10, 23, 11}

$X_{18}$={19, 23, 17, 18, 13, 16, 21, 10, 6, 9, 8, 22, 15, 3, 2, 7, 4, 20, 5, 14, 11, 1, 12}

$X_{19}$={20, 1, 18, 19, 14, 17, 22, 11, 7, 10, 9, 23, 16, 4, 3, 8, 5, 21, 6, 15, 12, 2, 13}

$X_{20}$={21, 2, 19, 20, 15, 18, 23, 12, 8, 11, 10, 1, 17, 5, 4, 9, 6, 22, 7, 16, 13, 3, 14}

$X_{21}$={22, 3, 20, 21, 16, 19, 1, 13, 9, 12, 11, 2, 18, 6, 5, 10, 7, 23, 8, 17, 14, 4, 15}

$X_{22}$={23, 4, 21, 22, 17, 20, 2, 14, 10, 13, 12, 3, 19, 7, 6, 11, 8, 1, 9, 18, 15, 5, 16}

In this manner, frequency hopping pattern codes of 23 types using all available frequencies in one cycle are formed. As described in the first embodiment, one of the formed frequency hopping pattern codes is stored in the hopping pattern memory 22 formed in the storage section 13 of the interrogator 1.

On the other hand, it is assumed by the available frequencies are represented by f1, f2, f3, ..., f23. In this manner, a frequency conversion table 31 in which the elements "1", "2", "3", ... of the matrix $X_0$ are caused to correspond to f1, f2, f3, ..., respectively is formed and set in the frequency oscillation section 17.

In this manner, the same operation and effect as those in the first embodiment can be achieved.

As in the second or third embodiment, at least two of the formed frequency hopping pattern codes may be stored in the hopping pattern memory 22 formed in the storage section 13 of the interrogator 1.

In each of the embodiments, the minimum prime number q or the power $q^2$ of the prime number in prime numbers larger than the number i of frequencies to be used is used. However, when any prime number larger than the number i of frequencies to be used or the power of the prime number is used, the same frequency hopping pattern codes as described above can be formed. After a power-on operation, the frequency hopping pattern codes described in the above embodiments may be formed, and the frequency hopping pattern codes may be set in a hopping pattern setting section.

In addition, various modifications of the present invention can be effected without departing from the spirit and scope of the invention. For example, the present invention can also be applied to a interrogator used in an RFID system using an entire UHF band (1 to 14 channels) of 952 to 955 MHz.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interrogator which performs radio communication with a responder by a frequency hopping scheme, comprising:

hopping pattern setting means for setting, as a frequency hopping pattern code, elements of a matrix in which all integers of "1" to "the number of frequencies to be used" appear only once and for obtaining the frequency hopping pattern code by adding, as an offset, any one of integers of "0" to "(the number of frequencies to be used)–1" to each of elements of a matrix obtained by excluding integers larger than the number of frequencies to be used from a matrix in which all integers of "1" to "(prime number larger than the number of frequencies to be used)–1" or "1" to "(positive integer power of a prime number larger than the number of frequencies to be used)–1" appear only once at pseudo random;

frequency oscillation means for converting the frequency hopping pattern code set by the hopping pattern setting means into the frequencies to be used to output unmodulated signals of the frequencies;

transmission means for modulating the unmodulated signal output by the frequency oscillation means by transmission data to output a modulated signal to an antenna; and reception means for demodulating a modulated signal from the responder received by the antenna by the unmodulated signal output by the frequency oscillation means.

2. The interrogator according to claim 1, further comprising:

reception determination means for performing reception at the frequency converted from the frequency hopping pattern code on start-up to determine the presence/absence of a reception signal; and transmission start means for starting transmission at a frequency at which the reception is performed when the reception determination means is determined that the reception signal is absent and to start transmission at a different frequency from the frequency at which the reception is performed when the reception determination means is determined that the reception signal is present.

3. The interrogator according to claim 2, further comprising:

hopping pattern storage means for storing, as frequency hopping pattern codes, a plurality of matrixes in each of which all integers of "1" to "the number of frequencies to be used" appear only once and for obtaining by adding, as an offset, at least two of integers of "0" to "(the number of frequencies to be used)–1" to each of elements of a matrix obtained by excluding integers larger than the number of frequencies to be used from a matrix in which all integers of "1" to "(prime number larger than the number of frequencies to be used)–1" or "1" to "(positive integer power of a prime number larger than the number of frequencies to be used)–1" appear only once; and pattern selection means for selecting a frequency hopping pattern code of one type from the frequency hopping pattern codes of a plurality of types stored in the hopping pattern storage means on the basis of identification information unique to the interrogator, wherein the hopping pattern setting means sets the frequency hopping pattern code selected by the pattern selection means.

4. The interrogator according to claim 3, wherein the pattern selection means replaces data of a (predetermined number)th bit with data of (another number)th bit different from the (predetermined number)th bit in a plurality of bit data representing the identification information unique to the interrogator, and, on the basis of information obtained after the bits are replaced with each other, selects a frequency hopping pattern code of one type from the frequency hopping pattern codes of the plurality of types stored by the hopping pattern storage means.

5. The interrogator according to claim 4, wherein in a combination of bits to be replaced with each other, bits of combinations except for a combination of a first lower bit and a second lower bit are used.

6. The interrogator according to claim 3, wherein the number of frequency hopping pattern codes stored in the hopping pattern storage means is equal to the number of frequencies to be used.

7. The interrogator according to claim 1, wherein in the hopping pattern setting means, the matrix in which all integers of "1" to "(prime number larger than the number of frequencies to be used)–1" or "1" to "(positive integer power of a prime number larger than the number of frequencies to be used)–1" appear only once is a matrix of remainders obtained by dividing $\alpha^n$ by q where q is the prime number larger than the number of frequencies to be used or the positive integer power of the prime number larger than the number of frequencies to be used, $\alpha$ is a primitive element, and n is an integer of "0" to "q–2".

8. The interrogator according to claim 2, wherein the transmission start means sets a frequency at which transmission is started when a reception signal is present to any frequency except for, of frequencies to be used, the frequency at which the reception is performed and a frequency adjacent to the frequency at which the reception is performed in a frequency hopping pattern.

9. The interrogator according to claim 2, further comprising:

a frequency conversion table in which data of frequencies to be used are stored in association with all the integers of "1" to "the number of frequencies to be used", wherein the frequency oscillation means converts the frequency hopping pattern code set by the hopping pattern setting means into a frequency with reference to the frequency conversion table.

10. The interrogator according to claim 9, further comprising:

frequency data storage means for storing the available frequencies in a low-frequency group obtained by extracting frequencies the number of which is the number of frequencies to be used from lower frequencies and a high-frequency group obtained by extracting frequencies the number of which is the number of frequencies to be used from higher frequencies and for storing data of the frequencies extracted as the low-frequency group and data of the frequencies extracted as the high-frequency group in association with all the integers of "1" to "the number of frequencies to be used"; and frequency data set means for selecting any one of the data of the frequencies extracted as the low-frequency group and the data of the frequencies extracted as the high-frequency group to set the data in the frequency conversion table.

11. The interrogator according to claim 1, further comprising:
- hopping pattern storage means for storing, as frequency hopping pattern codes, a plurality of matrixes in each of which all integers of "1" to "the number of frequencies to be used" appear only once and for obtaining by adding, as an offset, at least two of integers of "0" to "(the number of frequencies to be used)−1" to each of elements of a matrix obtained by excluding integers larger than the number of frequencies to be used from a matrix in which all integers of "1" to "(prime number larger than the number of frequencies to be used)−1" or "1" to "(positive integer power of a prime number larger than the number of frequencies to be used)−1" appear only once;
- pattern selection means for selecting a frequency hopping pattern code of one type from the frequency hopping pattern codes of a plurality of types stored in the hopping pattern storage means on the basis of identification information unique to the interrogator,
- wherein the hopping pattern setting means sets the frequency hopping pattern code selected by the pattern selection means.

12. The interrogator according to claim 11, wherein the pattern selection means replaces data of a (predetermined number)th bit with data of (another number)th bit different from the (predetermined number)th bit in a plurality of bit data representing the identification information unique to the interrogator, and, on the basis of information obtained after the bits are replaced with each other, selects a frequency hopping pattern code of one type from the frequency hopping pattern codes of the plurality of types stored by the hopping pattern storage means.

13. The interrogator according to claim 12, wherein in a combination of bits to be replaced with each other, bits of combinations except for a combination of a first lower bit and a second lower bit are used.

14. The interrogator according to claim 11, wherein the number of frequency hopping pattern codes stored in the hopping pattern storage means is equal to the number of frequencies to be used.

15. The interrogator according to claim 1, further comprising:
- a frequency conversion table in which data of frequencies to be used are stored in association with all the integers of "1" to "the number of frequencies to be used",
- wherein the frequency oscillation means converts the frequency hopping pattern code set by the hopping pattern setting means into a frequency with reference to the frequency conversion table.

16. The interrogator according to claim 15, further comprising:
- frequency data storage means for storing the available frequencies in a low-frequency group obtained by extracting frequencies the number of which is the number of frequencies to be used from lower frequencies and a high-frequency group obtained by extracting frequencies the number of which is the number of frequencies to be used from higher frequencies and for storing data of the frequencies extracted as the low-frequency group and data of the frequencies extracted as the high-frequency group in association with all the integers of "1" to "the number of frequencies to be used"; and
- frequency data set means for selecting any one of the data of the frequencies extracted as the low-frequency group and the data of the frequencies extracted as the high-frequency group to set the data in the frequency conversion table.

17. The interrogator according to claim 1, wherein in the hopping pattern setting means, the matrix in which all integers of "1" to "(prime number larger than the number of frequencies to be used)−1" or "1" to "(positive integer power of a prime number larger than the number of frequencies to be used)−1" appear only once is
a matrix of remainders obtained by dividing $\alpha^n$ by q where q is the prime number larger than the number of frequencies to be used or the positive integer power of the prime number larger than the number of frequencies to be used, $\alpha$ is a primitive element, and n is an integer of "0" to "q−2".

18. An interrogator which performs radio communication with a responder by a frequency hopping scheme, comprising:
- a sender which is configured to modulate an unmodulated signal by transmission data to output a modulated signal to an antenna;
- a receiver which is configured to demodulate a modulated signal from the responder received by the antenna by the unmodulated signal;
- a hopping pattern setting section having a hopping pattern table which is configured to set, as a frequency hopping pattern code, elements of a matrix in which all integers of "1" to "the number of frequencies to be used" appear only once and which is obtained by adding, as an offset, any one of integers of "0" to "(the number of frequencies to be used)−1" to each of elements of a matrix obtained by excluding integers larger than the number of frequencies to be used from a matrix in which all integers of "1" to "(prime number larger than the number of frequencies to be used)−1" or "1" to "(positive integer power of a prime number larger than the number of frequencies to be used)−1" appear only once at pseudo random; and
- a frequency oscillator which is configured to convert the frequency hopping pattern code set by the hopping pattern setting section into the frequencies to be used to output unmodulated signals of the frequencies to the sender and the receiver.

19. The interrogator according to claim 18, further comprising:
- a controller which is configured to perform reception at the frequency converted from the frequency hopping pattern code on start-up to determine the presence/absence of a reception signal from the sender, to start transmission at a frequency at which the reception is performed when the controller is determined that the reception signal is absent, and to start transmission at a different frequency from the frequency at which the reception is performed when the controller is determined that the reception signal is present.

20. The interrogator according to claim 18, further comprising:
- the hopping pattern table which is configured to store a plurality of matrixes in each of which all integers of "1" to "the number of frequencies to be used" appear only once as a frequency hopping pattern code; and
- a pattern selection section which is configured to select a frequency hopping pattern code of one type from the frequency hopping pattern codes of the plurality of types stored in the hopping pattern table on the basis of identification information unique to the interrogator to set the frequency hopping pattern code in the hopping pattern setting section.

21. A method of performing radio communication with a responder by a frequency hopping scheme, comprising:
storing, as a frequency hopping pattern code, to a memory elements of a matrix in which all integers of "1" to "the number of frequencies to be used" appear only once;
obtaining the frequency hopping pattern code stored in the memory by adding, as an offset, any one of integers of "0" to "(the number of frequencies to be used)–1" to each of elements of a matrix obtained by excluding integers larger than the number of frequencies to be used from a matrix in which all integers of "1" to "(prime number larger than the number of frequencies to be used)–1" or "1" to "(positive integer power of a prime number larger than the number of frequencies to be used)–1" appear only once at pseudo random;
converting the frequency hopping pattern code into the frequencies to be used to output unmodulated signals of the frequencies;
modulating the unmodulated signal by transmission data to output a modulated signal to an antenna; and
demodulating a modulated signal from the responder received by the antenna by the unmodulated signal.

22. An interrogator which performs radio communication with a responder by a frequency hopping scheme, comprising:
hopping pattern setting section which sets, as a frequency hopping pattern code, elements of a matrix in which all integers of "1" to "the number of frequencies to be used" appear only once and obtains the frequency hopping pattern code by adding, as an offset, any one of integers of "0" to "(the number of frequencies to be used)–1" to each of elements of a matrix obtained by excluding integers larger than the number of frequencies to be used from a matrix in which all integers of "1" to "(prime number larger than the number of frequencies to be used)–1" or "1" to "(positive integer power of a prime number larger than the number of frequencies to be used)–1" appear only once at pseudo random;
frequency oscillator which converts the frequency hopping pattern code set by the hopping pattern setting section into the frequencies to be used to output unmodulated signals of the frequencies;
transmitter which modulates the unmodulated signal output by the frequency oscillator by transmission data to output a modulated signal to an antenna; and
receiver which demodulates a modulated signal from the responder received by the antenna by the unmodulated signal output by the frequency oscillator.

23. The interrogator according to claim 22, further comprising:
reception determination section configured to perform reception at the frequency converted from the frequency hopping pattern code on start-up to determine the presence/absence of a reception signal; and
transmission start section configured to start transmission at a frequency at which the reception is performed when the reception determination section is determined that the reception signal is absent and to start transmission at a different frequency from the frequency at which the reception is performed when the reception determination section is determined that the reception signal is present.

24. The interrogator according to claim 23, further comprising:
hopping pattern storage which stores, as frequency hopping pattern codes, a plurality of matrixes in each of which all integers of "1" to "the number of frequencies to be used" appear only once and obtains by adding, as an offset, at least two of integers of "0" to "(the number of frequencies to be used)–1" to each of elements of a matrix obtained by excluding integers larger than the number of frequencies to be used from a matrix in which all integers of "1" to "(prime number larger than the number of frequencies to be used)–1" or "1" to "(positive integer power of a prime number larger than the number of frequencies to be used)–1" appear only once; and
pattern selection section configured to select a frequency hopping pattern code of one type from the frequency hopping pattern codes of a plurality of types stored in the hopping pattern storage on the basis of identification information unique to the interrogator,
wherein the hopping pattern setting section sets the frequency hopping pattern code selected by the pattern selection section.

25. The interrogator according to claim 24, wherein
the pattern selection section configured to replace data of a (predetermined number)th bit with data of (another number)th bit different from the (predetermined number)th bit in a plurality of bit data representing the identification information unique to the interrogator, and, on the basis of information obtained after the bits are replaced with each other, select a frequency hopping pattern code of one type from the frequency hopping pattern codes of the plurality of types stored by the hopping pattern storage.

26. The interrogator according to claim 25, wherein
in a combination of bits to be replaced with each other, bits of combinations except for a combination of a first lower bit and a second lower bit are used.

27. The interrogator according to claim 24, wherein
the number of frequency hopping pattern codes stored in the hopping pattern storage is equal to the number of frequencies to be used.

28. The interrogator according to claim 22, wherein
in the hopping pattern setting section, the matrix in which all integers of "1" to "(prime number larger than the number of frequencies to be used)–1" or "1" to "(positive integer power of a prime number larger than the number of frequencies to be used)–1" appear only once is
a matrix of remainders obtained by dividing $\alpha^n$ by q where q is the prime number larger than the number of frequencies to be used or the positive integer power of the prime number larger than the number of frequencies to be used, $\alpha$ is a primitive element, and n is an integer of "0" to "q–2".

29. The interrogator according to claim 23, wherein
the transmission start section which sets a frequency at which transmission is started when a reception signal is present to any frequency except for, of frequencies to be used, the frequency at which the reception is performed and a frequency adjacent to the frequency at which the reception is performed in a frequency hopping pattern.

30. The interrogator according to claim 23, further comprising:
a frequency conversion table in which data of frequencies to be used are stored in association with all the integers of "1" to "the number of frequencies to be used"

wherein the frequency oscillator converts the frequency hopping pattern code set by the hopping pattern setting section into a frequency with reference to the frequency conversion table.

31. The interrogator according to claim 23, further comprising:
frequency data storage which stores the available frequencies in a low-frequency group obtained by extracting frequencies the number of which is the number of frequencies to be used from lower frequencies and a high-frequency group obtained by extracting frequencies the number of which is the number of frequencies to be used from higher frequencies and for storing data of the frequencies extracted as the low-frequency group and data of the frequencies extracted as the high-frequency group in association with all the integers of "1" to "the number of frequencies to be used"; and
frequency data set section which selects any one of the data of the frequencies extracted as the low-frequency group and the data of the frequencies extracted as the high-frequency group to set the data in the frequency conversion table.

32. The interrogator according to claim 22, further comprising:
hopping pattern storage which stores, as frequency hopping pattern codes, a plurality of matrixes in each of which all integers of "1" to "the number of frequencies to be used" appear only once and for obtaining by adding, as an offset, at least two of integers of "0" to "(the number of frequencies to be used)–1" to each of elements of a matrix obtained by excluding integers larger than the number of frequencies to be used from a matrix in which all integers of "1" to "(prime number larger than the number of frequencies to be used)–1" or "1" to "(positive integer power of a prime number larger than the number of frequencies to be used)–1" appear only once;
pattern selection section which selects a frequency hopping pattern code of one type from the frequency hopping pattern codes of a plurality of types stored in the hopping pattern storage on the basis of identification information unique to the interrogator,
wherein the hopping pattern setting section sets the frequency hopping pattern code selected by the pattern selection section.

33. The interrogator according to claim 32, wherein
the pattern selection section which replaces data of a (predetermined number)th bit with data of (another number)th bit different from the (predetermined number)th bit in a plurality of bit data representing the identification information unique to the interrogator, and, on the basis of information obtained after the bits are replaced with each other, selects a frequency hopping pattern code of one type from the frequency hopping pattern codes of the plurality of types stored by the hopping pattern storage.

34. The interrogator according to claim 33, wherein
in a combination of bits to be replaced with each other, bits of combinations except for a combination of a first lower bit and a second lower bit are used.

35. The interrogator according to claim 32, wherein
the number of frequency hopping pattern codes stored in the hopping pattern storage is equal to the number of frequencies to be used.

36. The interrogator according to claim 22, further comprising:
a frequency conversion table in which data of frequencies to be used are stored in association with all the integers of "1" to "the number of frequencies to be used",
wherein the frequency oscillator converts the frequency hopping pattern code set by the hopping pattern setting section into a frequency with reference to the frequency conversion table.

37. The interrogator according to claim 36, further comprising:
frequency data storage which stores the available frequencies in a low-frequency group obtained by extracting frequencies the number of which is the number of frequencies to be used from lower frequencies and a high-frequency group obtained by extracting frequencies the number of which is the number of frequencies to be used from higher frequencies and for storing data of the frequencies extracted as the low-frequency group and data of the frequencies extracted as the high-frequency group in association with all the integers of "1" to "the number of frequencies to be used"; and
frequency data set section which selects any one of the data of the frequencies extracted as the low-frequency group and the data of the frequencies extracted as the high-frequency group to set the data in the frequency conversion table.

38. The interrogator according to claim 22, wherein
in the hopping pattern setting section, the matrix in which all integers of "1" to "(prime number larger than the number of frequencies to be used)–1" or "1" to "(positive integer power of a prime number larger than the number of frequencies to be used)–1" appear only once is a matrix of remainders obtained by dividing $\alpha^n$ by q where q is the prime number larger than the number of frequencies to be used or the positive integer power of the prime number larger than the number of frequencies to be used, $\alpha$ is a primitive element, and n is an integer of "0" to "q–2".

* * * * *